Figure 1:
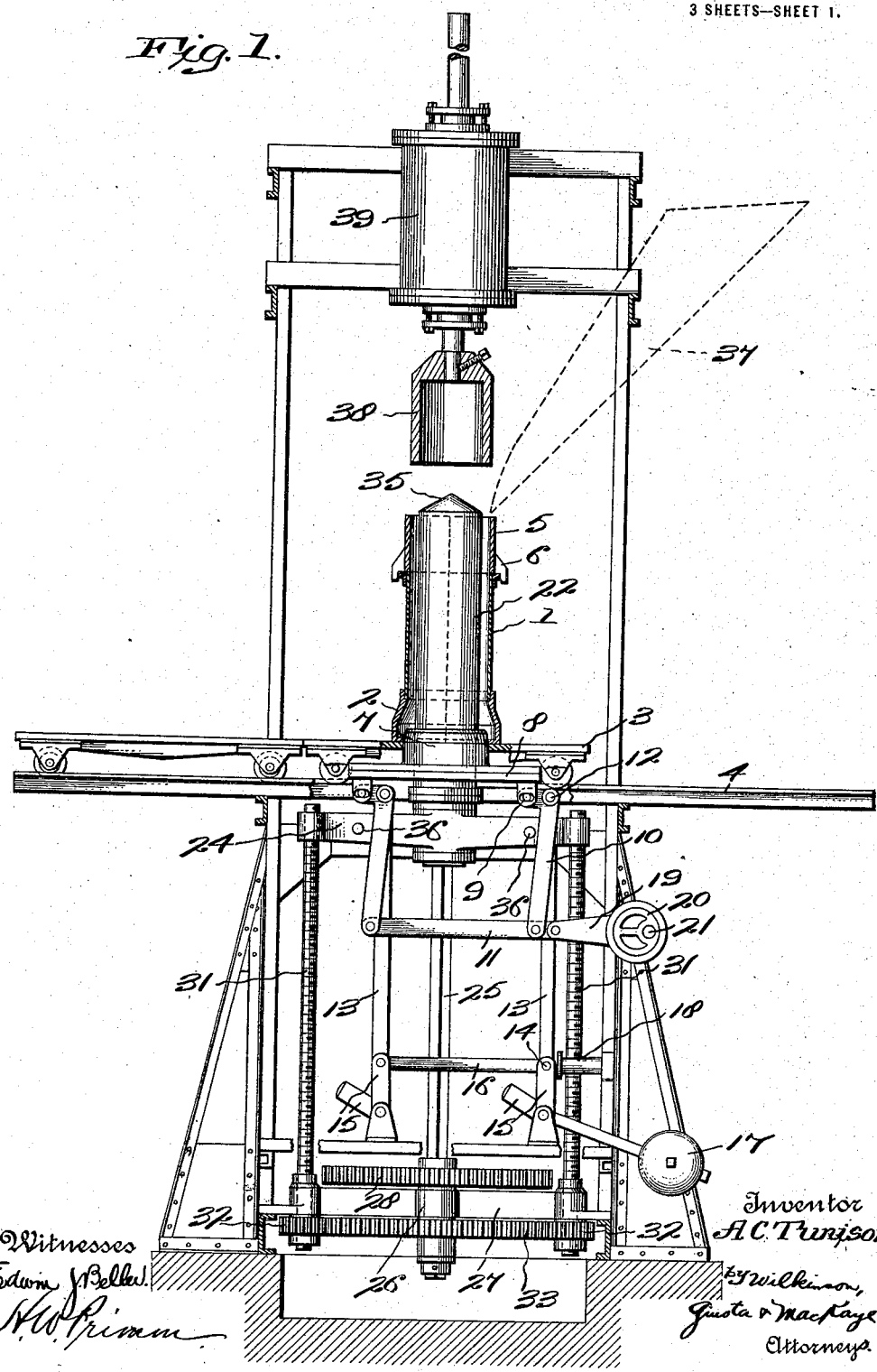

A. C. TUNISON.
MOLDING MACHINE.
APPLICATION FILED JULY 7, 1913. RENEWED MAY 17, 1915.

1,166,562.

Patented Jan. 4, 1916.
3 SHEETS—SHEET 1.

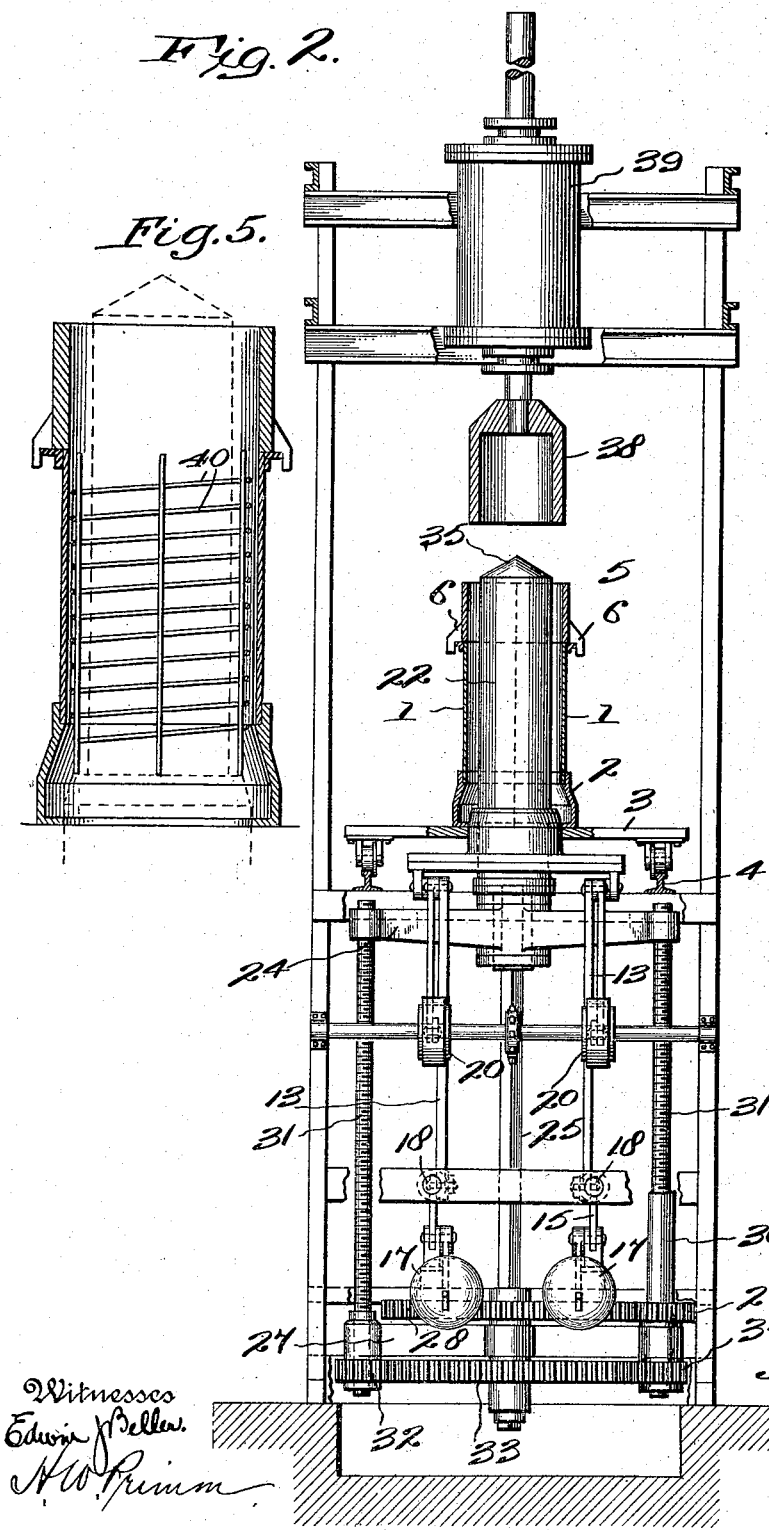

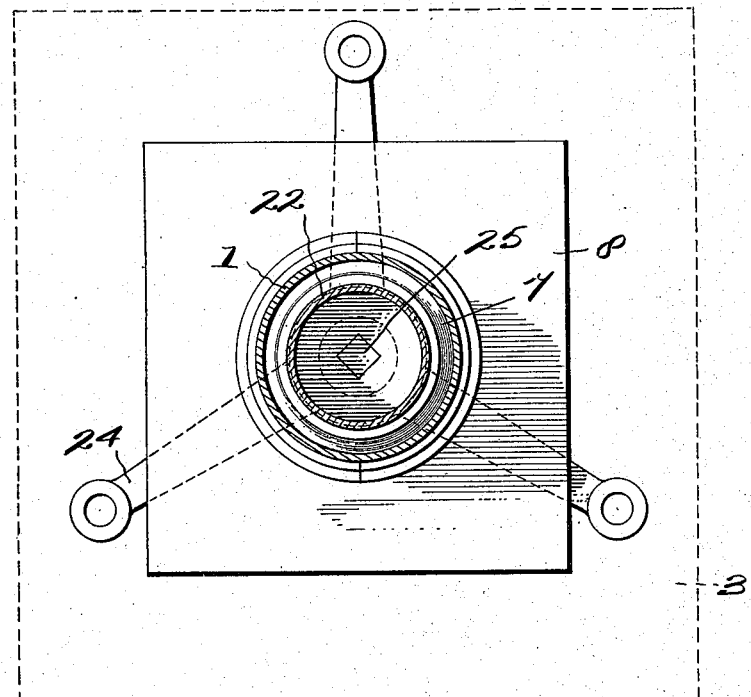
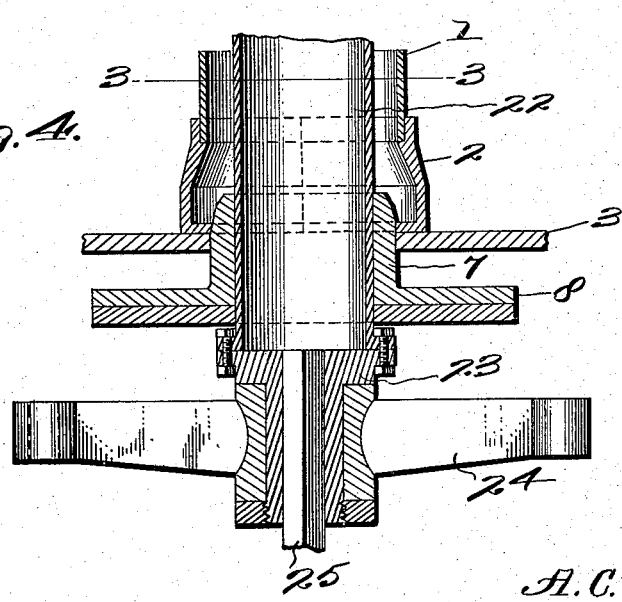

UNITED STATES PATENT OFFICE.

ARTHUR C. TUNISON, OF SALT LAKE CITY, UTAH, ASSIGNOR TO ATLAS CONCRETE PIPE MACHINERY COMPANY, OF SALT LAKE CITY, UTAH, A CORPORATION OF UTAH.

MOLDING-MACHINE.

1,166,562.     Specification of Letters Patent.     Patented Jan. 4, 1916.

Application filed July 7, 1913, Serial No. 777,797. Renewed May 17, 1915. Serial No. 28,770.

*To all whom it may concern:*

Be it known that I, ARTHUR C. TUNISON, a citizen of the United States, residing at Salt Lake City, in the county of Salt Lake and State of Utah, have invented certain new and useful Improvements in Molding-Machines; and I do hereby declare the following to be a full, clear, and exact description of the invention, such as will enable others skilled in the art to which it appertains to make and use the same.

My invention relates to improvements in molding machines, particularly pipe molding machines, and it consists in the constructions, combinations and arrangements herein described and claimed.

An object of my invention is to provide an improved machine for forming pipes or other objects of concrete or other plastic material, which will operate automatically to insure a greater compression and more uniform density of the material throughout the length of the object molded than has been possible in previous machines. In molding certain kinds of concrete, particularly cement or hydraulic concrete, it is desirable to have any compressing and tamping effect, directed as much as possible along one line. In my present invention I have devised means for effecting both a compressing and a tamping effect along one line in opposed directions, so that the material is both compressed and tamped between the two means, while subjected to comparatively little lateral displacement.

A further object of my invention is to provide a compact and strong machine for forming objects of concrete or other plastic material, which will have a maximum capacity and operate effectively for forming reinforced or other pipes without danger of injury to the metal reinforcements.

In the accompanying drawings forming a part of this application, in which similar reference symbols indicate corresponding parts in the several views: Figure 1 is a detail side elevation illustrating one embodiment of my invention, a pipe mold and compressing plunger being shown in axial section; Fig. 2 is an elevation at the right hand of Fig. 1, with a pipe mold and plunger shown in section; Fig. 3 is a section on the line 3—3 of Fig. 4; Fig. 4 is an enlarged fragmentary section of a bell ring and adjacent portions of a pipe mold and its core; and Fig. 5 is a section showing a reinforce in position in the pipe mold.

Referring to the drawings, 1 indicates a primary mold here shown as a pipe mold provided with a flaring bell end 2 supported on the apertured bed 3 of a truck traveling on rails 4; said mold being provided with an auxiliary mold section 5 detachably supported thereon in any suitable manner, as by lugs 6 engaging the outer periphery of said mold 1 which is in three parts.

A bell ring 7, which in this form constitutes a shaping and tamping end for the mold adapted to fit closely through the apertured bed 3, is carried by a platen 8 supported by pin and slot connections 9 on the short arms of a series of bell-crank levers 10, which latter are fulcrumed at 12 on the upper ends of vertical rods 13 pivotally supported at 14 on bell-crank levers 15, which are connected in pairs by links 16; said levers 15 being provided with weights 17 for yieldingly maintaining them in their normal upper position against a limiting stop 18.

The bell-crank levers 10 are connected together in pairs by links 11 pivotally connected to the radius rods 19 of eccentrics 20 secured on a sprocket driven power-actuated shaft 21, for oscillating said bell-crank levers 10 to reciprocate the platen 8 and the shaping end 7 carried by the latter. Obviously, any other well known power-actuated or manually-operated means could be employed in place of the eccentrics 20 for oscillating said bell crank levers 10.

A pipe core 22 provided with a conical upper end 35 is detachably secured to a head 23 swiveled on a spider 24 and provided with a square opening for slidably receiving a vertical square shaft 25 journaled at 26 in a lower frame 27; said shaft 25 carrying a fast gear 28 in mesh with a pinion 29 on a drive shaft 30. A series of screw shafts 31 are threaded through the spider 24, with their lower ends journaled in the frame 27 and provided with pinions 32 in mesh with a loose gear 33 rotatably mounted on the shaft 25. The gear 33 meshes with a loose pinion 34 on the drive shaft 30; said loose pinion 34 being adapted to be locked to the drive shaft 30 by any usual form of shiftable clutch. The spider 24 is provided with pins 36 adapted to engage the weighted bell-crank levers 15 and swing the latter to lower the vertical rods 13 and the bell-crank levers 10 fulcrumed on said rods; thereby lowering the platen 8 to automatically withdraw the bell ring 7 from the mold 1 when said spider 24 has been lowered to withdraw the pipe core from said mold.

In the operation of my invention, the screw shafts 30 are rotated by the gear 33 to lower the spider 24 and shift the pipe core 22 downwardly to position for extending through the bell ring 7 for closing the bottom of the mold; in this position of said core, the pins 36 on the spider are not lowered into engagement with the bell-crank levers 15, and said levers 15 are maintained upwardly by their weights 17 to position the bell ring 7 within the pipe mold. I provide a plunger 38 with a face adapted to shape that end of the object, here a pipe, which is opposite the end shaped by the tamping member or bell ring 7. In the form of the invention here indicated, this plunger is hollow. This hollow is to accommodate the upper part of the core 22 which protrudes into it when the effect of the plunger is complete. This plunger is actuated by hydraulic cylinder 39, or any other well known power device.

In Fig. 5 I have indicated in outline, a mold in which reinforce has been placed prior to filling. In the case of a pipe the reinforce should be such as to resist lateral strain rather than longitudinal stresses, the reinforce extending to about the top of the primary mold. I show a wire 40 and supporting rods 41 for said wire. A measured batch of mixed concrete or other plastic material, the reinforce, if reinforce is to be used, having been first placed in position, is supplied to the mold from a hopper 37. The core 22 is then thrust upward to its highest position within the mold 1 by the screw shafts 31; the square shaft 25 being driven by the gear 28. During such elevation the core 22 is rotated. The purpose of this rotation is to effect an even distribution of the material within the mold, and also to smooth the inner surface of the object, if a round object or an object with a round opening in it, is to be shaped. The plunger 38, which, as stated above, constitutes a forming end of the mold, is then thrust or forced downward by the hydraulic cylinder, and the material from the auxiliary mold section 5 is, by this movement, compacted so that the total length of the object molded does not exceed the length of the primary mold 1. While the material is undergoing compression by the part 38, it is subjected to the tamping effect of the part 7 within the other end of the mold, thereby subjecting the plastic material to a strong pressure and a repeated tamping action simultaneously in the respective ends of the mold, at the same time, of course, shaping it at both ends. After the plastic material has been thus strongly compacted within the mold 1, the screw shafts 31 are rotated by their gear 33 to further lower the spider 24 for withdrawing the core entirely from the mold. During such final lowering of the spider 24, the pins 36 thereon engage the bell-crank levers 15 and shift the vertical rods 13 downwardly to withdraw the bell ring 7 completely from the mold. The mold supporting carriage is then shifted along the track 4 for removing the completed mold, and a new mold similarly shifted into position for the formation of a pipe. The pipe and mold are allowed to stand until the concrete of the pipe has partly set, then the section 5 is lifted off and the two parts of the mold 1 removed.

From the above description, it will be clear that my invention provides an improved means for insuring a strong compression and uniform density of the plastic material throughout the pipe length, and is adapted to operate effectively on all characters of reinforcing pipes without danger of displacing or destroying the metal reinforcements.

I have illustrated and described preferred and satisfactory constructions, but changes could be made within the spirit and scope of my invention as disclosed in the statement of invention and the appended claims.

I claim:—

1. In a molding machine, the combination of a mold, an auxiliary mold section thereon, means for supplying material to one end of said mold section, a plunger, means for forcing said plunger through said section for compressing the material in said mold, a reciprocating member extending within the opposite end of said mold, and means for reciprocating said member during the actuation of said plunger.

2. In a molding machine, the combination of a pipe mold provided with a flaring bell end, a detachable auxiliary mold section thereon, means for supplying material to said mold and section, a plunger, means for forcing said plunger through said section for compressing the material in said mold, a bell ring extending within the flaring end of said mold, and means for reciprocating said bell ring during the actuation of said plunger.

3. In a molding machine, the combination of a pipe mold, a detachable auxiliary mold section thereon, an apertured supporting bed therefor, a bell ring adapted to extend through said apertured bed, means for reciprocating said bell ring, a core, means for shifting said core through said bell ring into and out of said mold, means for rotating said core independently of such shifting thereof, and means for withdrawing said bell ring from the mold.

4. In a pipe molding machine, the combination of a mold, a reciprocatingly mounted pipe core, means for inserting and withdrawing said core from said mold, means for rotating said core in its several shifted positions, a bell ring slidably mounted on said core, means for shifting said bell ring into and out of said mold, and means for reciprocating said bell ring for tamping the material in said mold.

5. In a pipe molding machine, the combination of a mold, a core, means for shifting said core into and out of said mold, a bell ring slidably mounted on said core, weights for normally maintaining said bell ring within said mold, and means for withdrawing said bell ring from said mold.

6. In a pipe molding machine, the combination of a mold, an apertured supporting bed therefor, a bell ring adapted to extend slidably through said apertured bed, a platen supporting said bell ring, a series of bell-crank levers reciprocatingly supporting said platen, and weighted means for shifting said bell-crank levers for forcing said bell ring into said mold.

7. In a pipe molding machine, the combination of a mold, an apertured supporting bed therefor, a bell ring adapted to extend slidably through said apertured bed, a platen supporting said bell ring, a series of bell-crank levers reciprocatingly supporting said platen, means for oscillating said bell-crank levers for reciprocating said bell ring within said mold, and means for engaging said weighted means for automatically withdrawing said bell ring from said mold.

8. In a molding machine, the combination of a pipe mold provided with a flaring bell end, a detachable auxiliary mold section thereon, means for supplying material to said mold and section, a plunger, means for forcing said plunger through said section, a core, means for rotating said core, a bell ring, and means for reciprocating said bell ring and rotating said core during the action of the plunger.

9. In a molding machine, in combination, a laterally separable mold, removable ends for said mold, means for reciprocating one of said ends to produce a tamping effect, and means acting simultaneously therewith to move the other end forward with a compressing action.

10. In a molding machine, in combination, a laterally separable mold, removable ends for said mold, means for moving one of said ends forward into said mold to shape and compress material in said mold, means for moving the second end forward to close the end of said mold, and means for giving said second end a reciprocating tamping action while it is in its forward position.

11. In a molding machine, in combination, a laterally separable mold, removable ends for said mold, means for moving one of said ends forward into said mold to shape and compress material in said mold, means for moving the second end forward to close the end of said mold, and means for giving said second end a reciprocating tamping action while it is in its forward position, said reciprocating means being carried on said forward moving means.

12. In a molding machine, in combination, a mold, removable ends for said mold, means for moving one of said ends forward to shape and compress material in said mold, means for moving the second end forward to shape the second end of the object, means for moving forward a core through said second end, and means for withdrawing said second end and core to permit the lateral removal of the mold and object.

13. In a molding machine, in combination, a primary mold, shaping ends for said mold, one of said ends being adapted to tamp and the other to compress with steady pressure, material in the mold, and means for actuating said tamping and compressing ends simultaneously, whereby material in said mold is subjected to directly opposed compressing and tamping effects.

14. In a molding machine, in combination, a primary mold, shaping ends for said mold, one of said ends being adapted to tamp and the other to compress with steady pressure, material in the mold, means for actuating said tamping and compressing ends simultaneously whereby material in said mold is subjected to directly opposed compressing and tamping effects, and an auxiliary mold adapted to be joined to one end of said primary mold and to hold a quantity of material sufficient to compensate for the compacting effect of the compressing and tamping actions.

15. In a molding machine, in combination, a mold, an apertured supporting bed therefor, a track on which said bed and mold may be moved into and out of position, a shaping end adapted to be pushed through the apertured bed, a support for said shaping end, bell crank levers supporting said end support, vertical rods supporting said bell crank levers, weighted bell cranks supporting said rods, a core adapted to pass through said shaping end into the mold, a spider carrying said core, means for moving said spider forward and back, means for reciprocating said end supporting levers, and means on said spider for engaging the rod supporting bell crank levers to lower the rods and withdraw the shaping end upon the withdrawal of the core.

16. In a molding machine, in combination, a mold, an apertured supporting bed therefor, a track on which said bed and mold may be moved into and out of position, a shaping and compressing end adapted to be pushed through the apertured bed, a support for said shaping end, bell crank levers supporting said end support, vertical rods supporting said bell crank levers, weighted bell cranks supporting said rods, a core adapted to pass through said shaping end into the mold, a spider carrying said core, means for moving said spider forward and back, means for reciprocating said end supporting levers, and means on said spider for engaging the rod supporting bell crank levers to lower the rods and withdraw the shaping end upon the withdrawal of the core.

17. In a molding machine, the combination of a primary mold provided with movable ends, a detachable auxiliary mold for one of said ends, means for supplying material to and through said auxiliary mold, a shaping plunger, means for forcing said plunger through said section for compacting the material in said auxiliary mold into the primary mold, a second shaping end for said primary mold, and means for reciprocating said second end to effect a tamping connection during the compressing movement of the compressing end.

18. In a molding machine, in combination, a primary mold, a core therefor, a compressing end for one end of said mold, a tamping end for the other end of said mold, a core for said primary mold, an opening in each of said ends through which said core may pass, and means for giving to one end a compressing action and to the other end a tamping action simultaneously.

In testimony whereof, I affix my signature, in presence of two witnesses.

ARTHUR C. TUNISON.

Witnesses:
 CONSTANCE JOHNSON,
 G. W. COPE.

Copies of this patent may be obtained for five cents each, by addressing the "Commissioner of Patents, Washington, D. C."